United States Patent
Krueger et al.

(10) Patent No.: US 11,261,941 B2
(45) Date of Patent: Mar. 1, 2022

(54) SHIFTABLE TRANSMISSION IN ROLLING MILL TECHNOLOGY

(71) Applicant: SMS Group GmbH, Duesseldorf (DE)

(72) Inventors: Matthias Krueger, Hilchenbach (DE); Frank Moellering, Kreuztal (DE); Nathalie Catic, Hilchenbach (DE)

(73) Assignee: SMS GROUP GMBH, Duesseldorf (DE)

( * ) Notice: Subject to any disclaimer, the term of this patent is extended or adjusted under 35 U.S.C. 154(b) by 91 days.

(21) Appl. No.: 16/622,418

(22) PCT Filed: Jun. 13, 2018

(86) PCT No.: PCT/EP2018/065702
§ 371 (c)(1),
(2) Date: Dec. 13, 2019

(87) PCT Pub. No.: WO2018/229150
PCT Pub. Date: Dec. 20, 2018

(65) Prior Publication Data
US 2020/0208716 A1 Jul. 2, 2020

(30) Foreign Application Priority Data
Jun. 14, 2017 (DE) .......................... 102017210083.4

(51) Int. Cl.
*F16H 3/085* (2006.01)
*F16H 3/093* (2006.01)
(Continued)

(52) U.S. Cl.
CPC ............. *F16H 3/085* (2013.01); *F16H 3/093* (2013.01); *B21B 35/04* (2013.01); *B21B 35/12* (2013.01);
(Continued)

(58) Field of Classification Search
CPC .. F16H 3/085; F16H 3/093; F16H 2003/0931; F16H 2200/0034;
(Continued)

(56) References Cited

U.S. PATENT DOCUMENTS 4,331,432 A * 5/1982 Blanchard .............. B63H 21/28
440/75
4,400,163 A * 8/1983 Blanchard .............. B63H 21/28
440/75
(Continued)

FOREIGN PATENT DOCUMENTS

| CN | 102305272 A | * | 1/2012 |
|---|---|---|---|
| CN | 104373525 A | | 2/2015 |
| CN | 205207552 U | | 5/2016 |
| JP | S542249 A | * | 1/1979 |

OTHER PUBLICATIONS

Notification of Second Office Action, dated Jun. 28, 2021, for Chinese Patent Application No. 201880039507.4.

*Primary Examiner* — Victor L MacArthur
(74) *Attorney, Agent, or Firm* — Abelman, Frayne & Schwab

(57) ABSTRACT

The invention relates to a shiftable transmission (1) having at least two shifting levels, preferably for use in rolling mill technology, said shiftable transmission comprising: a rotatably mounted input shaft (20), to which an input torque can be applied; a rotatably mounted first output shaft (30) and a rotatably mounted second output shaft (40), which are arranged parallel and are connected to each other by means of an output transmission stage in such a way that aid output shafts rotate oppositely, preferably at the same rotational speed, when an input torque is applied to the input shaft (20) at any shifting level of the shiftable transmission (1); a first coupling (50), which is designed to selectively connect an disconnect the input shaft (20) and the first output shaft (30), a first shifting level of the shiftable transmission (1) being
(Continued)

realized in the coupled state, in which first shifting level the input shaft (20) and the first output shaft (30) are connected to each other in such a way that the input torque is transferred from the input shaft (20) to the first output shaft (30) without step-up or step-down, preferably without redirection and without a spur gear stage.

14 Claims, 1 Drawing Sheet

(51) Int. Cl.
*B21B 35/04* (2006.01)
*B21B 35/12* (2006.01)

(52) U.S. Cl.
CPC ............ *F16H 2003/0931* (2013.01); *F16H 2200/0034* (2013.01); *F16H 2200/0056* (2013.01)

(58) Field of Classification Search
CPC . F16H 2200/0056; B21B 35/12; B21B 35/04; B21B 35/141; B30B 3/04
See application file for complete search history.

(56) References Cited

U.S. PATENT DOCUMENTS

| | | | |
|---|---|---|---|
| 5,325,697 A * | 7/1994 | Shore | B21B 1/18 72/234 |
| 6,148,981 A * | 11/2000 | Lindenthal | F16D 1/0805 192/150 |
| 7,685,899 B2 * | 3/2010 | Mowbray | B63H 23/06 74/329 |
| 2005/0172741 A1 * | 8/2005 | Van Der Plas | A01K 5/004 74/336 R |
| 2005/0211007 A1 * | 9/2005 | Suzuki | F16H 61/688 74/340 |

* cited by examiner

SHIFTABLE TRANSMISSION IN ROLLING MILL TECHNOLOGY

RELATED APPLICATIONS

This application is a National Stage application of International application PCT/EP2018/065702 filed Jun. 13, 2018 and which claims priority of German application No. 102017 210 083.4 filed Jun. 14, 2017, both applications are incorporated herein by reference thereto.

FIELD OF THE INVENTION

The present invention relates to a shiftable transmission, in particular, to a spur gear-pinion shiftable transmission with at least two shiftable stages, having a rotatably supported input shaft a rotatably supported first output shaft, and a rotatably supported second output shaft arranged parallel to each other and connected by an output transmission stage in such a manner that in each shifting stage of the shiftable transmission upon application of an input torque to the input shaft, they rotate in opposite directions. The shiftable transmission is used, advantageously, as a portion of a roll drive, for driving work rolls, intermediate rolls, and/or backup rolls in the rolling mill technology.

BACKGROUND OF THE INVENTION

In the rolling mill technology, a stand main drive is formed of a drive with spur gear shifting stage and a pinion shifting stage. The spur gear stage serves for changing the output rotational speed (or the output torque) with respect to the input rotational speed (or the input torque). The pinion shifting stage provides for rotation of the associated upper roll and lower roll in opposite directions with the same rotational speed.

E.g., DE 4219399 describes a roll drive for machine rolls having a shiftable transmission between an input shaft and to be driven pressure roll.

Basically, each meshing engagement with the transmission generates vibrations in the drive train with a meshing frequency in the meshing stage and its harmonics. Such drive train excitations can stimulate, in particular in high-speed rolling installations such as cold rolling mills, natural vibration modes of the rolling stands or of the roll sets (for example, according to so-called $5^{th}$-Octave Chatter), whereby the product quality can be noticeably affected. To prevent critical vibration excitation, often, limitation of the production speed becomes necessary. At such speed-proportional stimulations, in particular, the toothings of the ratio-increasing or the ratio-reducing stage are necessarily involved, because they have, in comparison with the pinion stage, a higher torque load. With conventional spur gear-pinion drives, this problem occurs for all of the shifting stages when one shifting stage is designed with a ratio in a range of or equal to one. Further, comparatively large mass inertia of the transmission gears can adversely influence the dynamic behavior and vibration behavior of the drive train, which can cause a problem in optimization of the speed control.

SUMMARY OF THE INVENTION

The object of the present invention is a shiftable transmission, in particular, for use in the rolling mill technology that has an improved vibration behavior and, therefore, advantageously, can reduce productivity and quality losses.

The object is achieved by a shiftable transmission with features of claim 1. Advantageous improvements follow from the dependent claims, disclosure of the invention and description of the preferred embodiments.

The shiftable transmission that has at least two shifting stages is particular suitable as a portion of the roll main drive, specifically, of work, intermediate, and/or backup rolls for cold rolling of strip products such as metal strips from steel or non-ferrous metal, the so-called NE-metals.

The shiftable transmission has a rotatably supported input shaft to which an input torque is applied. The input shaft can, e.g., be driven by an electric motor, i.e., be rotated thereby. The shiftable transmission further has a rotatably supported first output shaft and a rotatably supported second output shaft which are arranged parallel to each other in their axial directions and are connected with each other by an output shifting stage so that they in each shifting stage of the shiftable transmission, upon application of the input torque to the input shaft rotate in opposite directions, preferably, with a same rotational speed.

Further the shiftable transmission has a first clutch which is set up to connect the input shaft and the first output shaft with each other and disconnect them from each other in a switching manner, wherein in a connecting condition of the first clutch, a first shifting stage of the shiftable transmission is realized in which the input shaft and the first output shaft are connected with each other so that the input torque is transmitted from the input shaft to the first output shaft without an increased or decreased ratio. In other words, in the connected condition of the first clutch, the input torque from the input shaft is transmitted to the first output shaft directly, without use of toothing, with a ratio one and without any deviation. Preferably, to this end, the input shaft and the first output shaft, in the connected condition of the first clutch, are rigidly connected.

Before the technical effects of the shifting transmission are discussed, it should be noted that the terms "first" and "second" simply serve to linguistically distinguish respective components, and they are to be understood as part of the terminology, without implication of any order. When further "connection" of rotatably supported transmission components, such as the input shaft and the first output shaft, is discussed, a rigid mechanical connection can be understood, it is important, however, that a torque transmission is insured.

When in the connected condition of the first clutch, a first shifting stage of the shiftable transmission is realized, the vibrations of the shiftable transmission, which are generated by any gear toothings, are eliminated because the input shaft and the first output shaft are connected by the first clutch, without toothing. In the first shifting stage of the shiftable transmission, a transmission stage with toothing is eliminated. This results in a favorable dynamic behavior of the drive train in the first shifting stage because the inertia masses such as spur gears of the conventional shifting stages, are dispensed with. Because of this, the shiftable transmission is inexpensive, compact, and low-maintenance.

Advantageously, the input shaft and the first output shaft are axially arranged one behind another along a same rotational axis, whereby a compact design can be realized. In this case, the input shaft and the first output shaft form different components which, however, are so connected technically that they function as a single shaft.

Preferably, the output transmission stage has a first pinion fixedly connected with the first output shaft and a second pinion fixedly connected with the second out shaft and meshing with the first pinion, wherein the first pinion and the second pinion have the same diameter. When shiftable transmission in this manner is formed as a pinion drive, multiple teeth of helical gears are simultaneously engage each other, whereby a low-vibration and uniform torque transmission is insured. It should be noted that the above-mentioned "fixed" connection form an integral and one-piece design. Both pinions have the same diameter to provide for the identical rotational speed at opposite rotational directions. Such construction is particularly suitable for driving a roll pair.

Preferably, the first clutch is a formlocking clutch having a first shift sleeve which according to a particular embodiment, is concentrically arranged with respect to the first output shaft and axially displaceable for shifting the first clutch.

This insures an easy connection and disconnection of the input shaft and the first output shaft in a technically simple and reliable manner, wherein for actuation of the first clutch, the first shift sleeve is axially displaced, i.e., is engaged or disengaged.

Preferably, the shiftable transmission has an input transmission stage that provides for increased or reduced ratio, preferably, reduced ratio between the input shaft and, second output shaft in the second shifting stage. Preferably, the first shifting stage is used with a ratio of about or equal to one for high rotational speeds at which the problem of vibration excitation is particularly acute. At lower rotational speeds, when the installation is less prone to vibrations, preferably, the second shifting stage is used with speed reduction.

Preferably, the input transmission stage has a first spur gear fixedly connected with the input shaft, and a second spur gear meshing with the first spur gear and connectable with the second output shaft, and in that in the second shifting stage, the input torque from the input shaft is transmitted to the second output shaft by the two spur gears, wherein a diameter of the first spur gear for the above-mentioned reason is, preferably, smaller than that of the second spur gear.

Therefore, the second shifting stage is realized in a mechanically simple and reliable manner. The shiftable transmission is particularly advantageously formed as a spur gear-pinion shiftable transmission. It should be noted that also in this case, the above-mentioned "fixed" connection includes an integral and one-piece design.

Preferably, the input transmission stage has a second clutch which is realized to connect the input shaft and the second output shaft or disconnect them in a switchable manner, wherein in a connecting condition of the second clutch, the second shifting stage of the shiftable transmission is realized. Preferably, the second clutch acts between the second output shaft and the second spur gear. With the rigid connection of the input shaft and the [first] output shaft in the first shifting stage, a second pair of spur gears is eliminated, whereby in view of the elimination of a mass inertia torque, a particularly favorable dynamic behavior of the drive train is achieved.

Preferably, the second clutch is a formlocking clutch which according to a particular embodiment, as in the case of the first clutch, has a second shift sleeve concentrically arranged relative to the second output shaft and axially displaceable for shifting the second clutch. Thereby, connection and disconnection of the input shaft or of the second spur gear from the second output shaft is realized in a technically simple and reliable manner, wherein for actuation of the second clutch, the second shift sleeve is axially displaced, i.e., is engaged or disengaged.

Preferably, the first clutch and the second clutch are so connected with each other, electronically, mechanically, or any other way, that they are shifted together in opposite directions. According to a particularly advantageous embodiment, the first clutch and the second clutch are mechanically connected with each other by a level mechanism. A mechanical connection of both clutches, which are to be actuated synchronously during the switching process, provides the shiftable transmission with an inherit reliability.

The described shiftable transmission is primarily designed for use in rolling mill technology, in particular, for cold rolling of metal strips, wherein the roll drive produces vibrations which can significantly affect the product quality. However, the shiftable transmission can be used in other fields.

Further advantages and features of the present invention will become apparent from the description of the preferred embodiments. The described features can stand alone or be used in combination with one or more of the described features as long as they do not conflict with each other. The following description of the preferred embodiments is made with reference to the accompanying drawings.

DETAILED DESCRIPTION OF THE PREFERRED EMBODIMENTS

Figure 1:
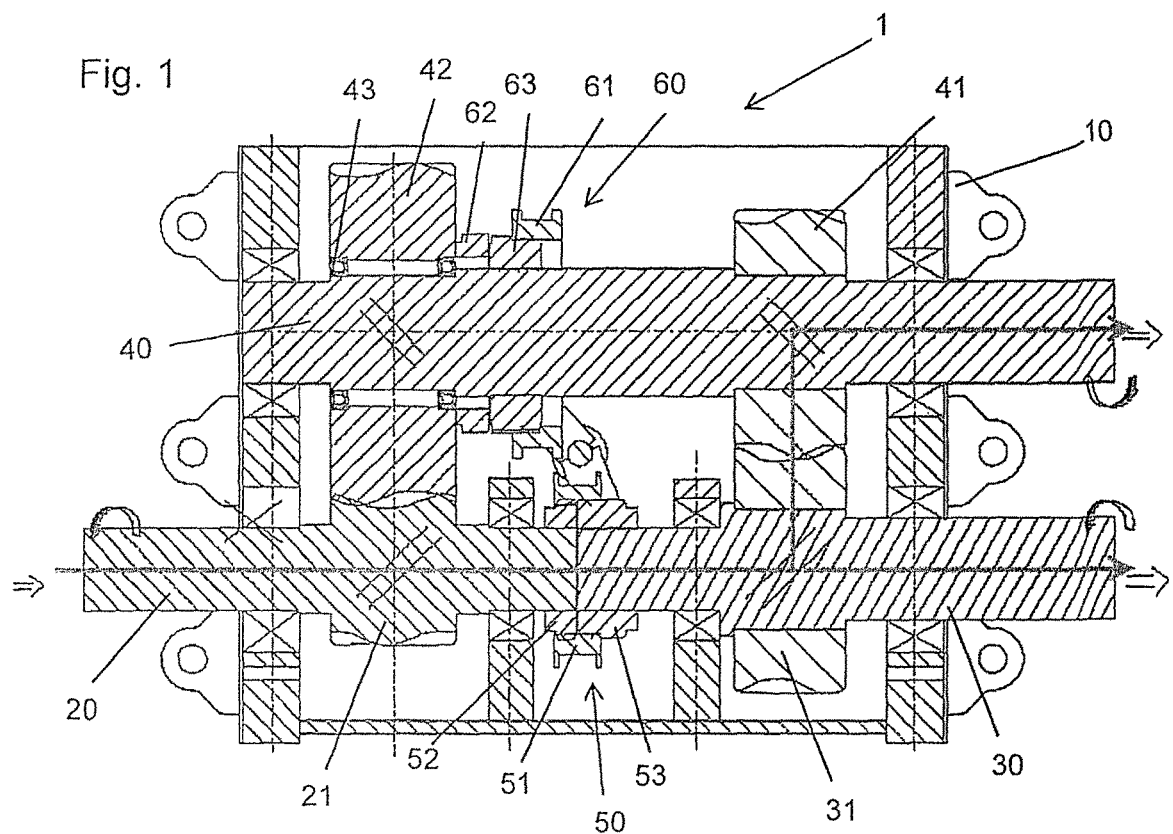
FIG. 1 shows schematically a spur gear-pinion transmission in a first shifting stage.

Below, preferred embodiments will be described, with reference to the drawings. At that, the same, similar, and functionally identical elements are designated with identical reference numerals and, in order to prevent redundancy, a repeated description of these elements will be, at least partially, avoided.

Figure 2:
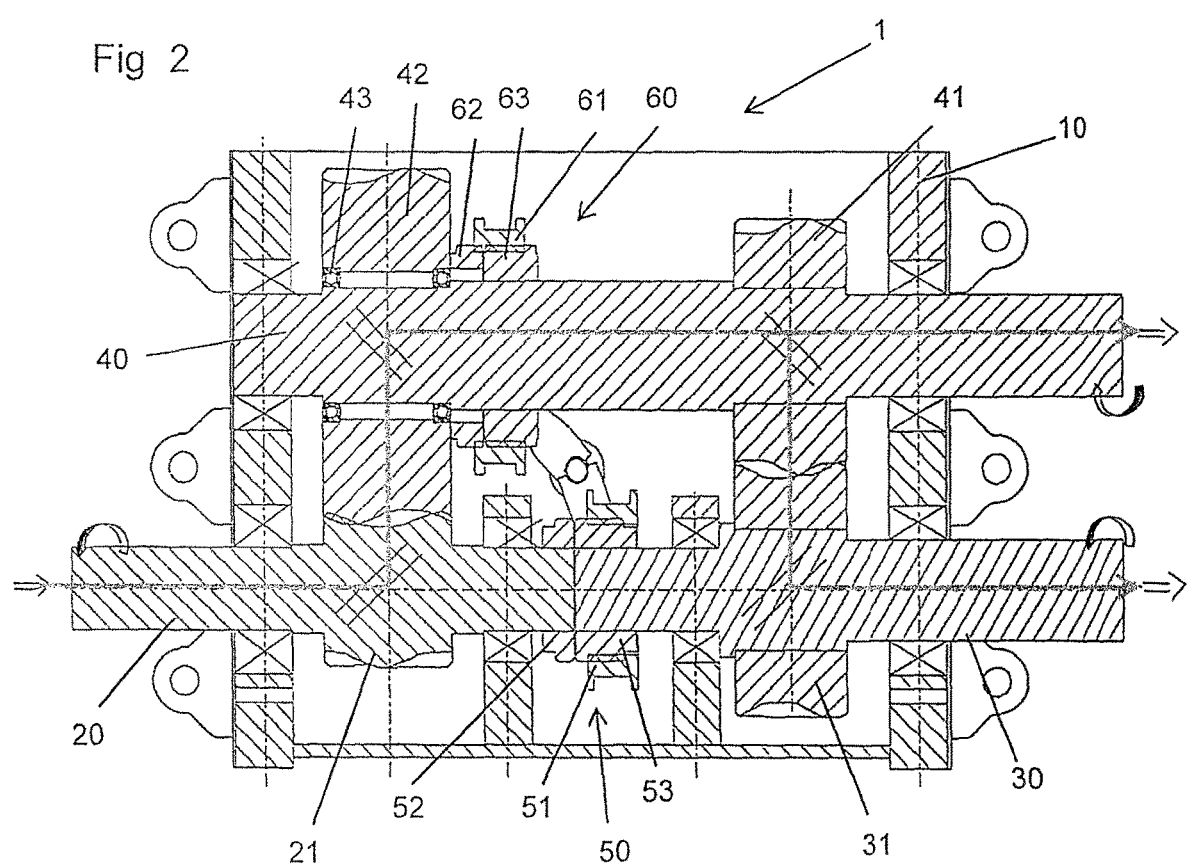
FIG. 2 shows schematically a spur gear-pinion transmission in a second shifting stage

FIGS. 1 and 2 show a shiftable transmission 1 formed, e.g., as spur gear-pinion transmission in two different shifting stages.

The shiftable transmission 1 has a housing 10 in which an input shaft 20, a first output shaft 30, and a second output shaft 40 are rotatably supported. The pivot bearings, which are shown in FIGS. 1 and 2 are not designated with a reference numeral for the sake of clarity In the drawings, the input shaft 20, the first output shaft 30, and the second output shaft 40 are arranged parallel to each other and wherein the input shaft 20 and the first output shaft 30 are located behind each other and are fixedly and releasably connected with each other by a first clutch 50. The input shaft 20 can be driven, e.g., by an electric motor, not shown. The torque of the input shaft 20 can be converted, if needed, as it will be described in detail below, and transmitted to both output shafts 30 and 40.

In the engaged condition of the first clutch 50, the input shaft 20 and the first output shaft 30 are fixedly connected with each other without toothing. Advantageously, the first clutch 50 formlockingly connects the two shafts. In the described embodiment, to this end, there is provided a first cylindrical shift sleeve 51 which is arranged concentrically relative to the input shaft 20 and the first output shaft 30 and is slidable in an axial direction. In the coupled state, the first shift sleeve 51 simultaneously engages both the input shaft 20 and the first output shaft 30, formlockingly connecting both shafts 20 and 30. The engagement can be carried out directly or the first shift sleeve 51 can be displaced, as shown in the discussed embodiment, by first clutch counterparts 52 and 53 fixedly connected, respectively, with the input shaft 20 and the first output shaft 30. Upon an axial displacement of the first shift sleeve 51, at least one of the two shafts 20 and 30 is not connected anymore therewith, and the first coupling is released, and the two shafts 20 and 30 are separated, whereby they can be rotated independently from each other. The first shift sleeve 51 can be actuated electrically, pneumatically, or in any other way. It should be noted that the first shift coupling can be formed in technically different manner. E.g., the fixed connection of the input shaft 20 and the first output shaft 30 can be realized as a forcelocking connection.

FIG. 1 shows the first clutch in an engaged state in which the input shaft 20 and the first output shaft 30 are fixedly connected with each other. The input torque is transmitted from the input shaft 20 to the first output shaft 30 in one-to-one relationship.

The first pinion 31 is fixedly connected with the first output shaft 30, optionally, is formed integrally therewith. The first pinion 31 engages a second pinion 41 which again is fixedly connected with the second output shaft 40, optionally, is formed integrally therewith, by teeth engagement. Both pinions 31 and 41 preferably have the same diameter so that at an input torque, both output shafts 30 and 40 are driven with the same rotational speed in opposite directions. In the discussed embodiment, both pinions 31 and 41 form the above-mentioned output gear stage. Instead of the pinions 31 and 41, other gear elements can be used, preferably, suitable forms of gear wheels, as long as it is insured that with an input torque applied to the input shaft 20, both output shafts 30 and 40 are driven with a predetermined rotational speed ratio, preferably with the same rotational speed in opposite directions.

In the coupled condition of FIG. 1 (first shifting stage), the torque transmission takes place as shown with arrows in FIG. 1, i.e., the input torque is transmitted to the first pinion 31 directly and without any redirection due to the fixed connection of the input shaft 20 with the first output shaft 30, which, in turn, provides for rotation of the second pinion 41 and the second output shaft 40 in the opposite direction. To achieve this force path, it is necessary that the second shifting stage, which is shown in FIG. 2 and will be described below, is disconnected.

In condition of FIG. 2, the input shaft 20 and the first output shaft 30 are disconnected, i.e., the first clutch 50 is disengaged. The first spur gear 21, which is fixedly connected with the input shaft 20 and, optionally, is formed integrally therewith, engages the second spur gear 42. The second spur gear 42 is so connected with the second output shaft 40 that upon rotation of the second spur gear 42, the second output shaft 40 can be rotated. Between the second spur gear 42 and the second output shaft 40, there is provided a bearing 43 which is so formed that in the first shifting stage of FIG. 1, i.e., at force transmission from the first pinion 31 to the second pinion 41, the second spur gear 42 is rotated without a torque being applied thereto.

Between the second spur gear 42 and the second output shaft 40, there is provided a second clutch 60 which can be displaced, as the first clutch 50, by an axially displaceable second cylindrical shift sleeve 61. In the engaged condition of the second clutch 60, the second output shaft 40 and the second spur gear 42 are fixedly connected with each other. Preferably, the second clutch 60 forms a formlocking connection. In the discussed embodiment, to this end, there is provided a second cylindrical shift sleeve 61 which is arranged concentrically with the second output shaft 40 and is displaced in the axial direction. In the engaged condition, the second shift sleeve 61 engages simultaneously both the second output shaft 40 and the second spur gear 42, formlockingly connecting both parts. The engagement can be direct or the second shift sleeve 41, as shown in the discussed embodiment, can be fixedly connected with the second spur gear 42 and the second output shaft 40 and be displaced therewith by two clutch counterparts 62 and 63 connected, respectively, with the second spur gear 42 and the second output shaft 40.

By axial disengagement of the second shift sleeve 61, the second clutch 60 is released, and the second spur gear 62 and the second output shaft 40 are separated, whereby they become rotatable independent from each other. As in the case of the first clutch 50, the actuation of the second shift sleeve 61 can be carried out electrically, pneumatically, or in any other way. It should also be noted that the second clutch 60 can be technically realized in other way, e.g., a forcelocking connection can be realized.

In the engaged condition of FIG. 2 (second shift stage), the torque transmission takes place as shown with arrows in FIG. 2, i.e., the input torque is transmitted from the input shaft 20, the first spur gear 21 to the second spur gear 42. Preferably, the first spur gear 21 is smaller than the second spur gear 42 to provide for reduction in the second shift stage. Simultaneously, the second clutch 60 is actuated, and a torque is transmitted from the second spur gear 42 to the second output shaft 40.

This, in turn, insures that the two pinions 41 and 31 transmit the torque to the first output shaft 30 which is mechanically separately from the input shaft 20 by the non-actuated first clutch 50.

According to the above-described construction, the first shift stage, shown, in FIG. 1, provides a fixed gear ratio of one (without increasing or decreasing the gear ratio) between the input and output. In the first shift stage, toothing is eliminated; a technical contribution made possible by the first clutch 50. The shiftable first clutch 50 fixedly connects without toothing, in the first shift stage, the input shaft 20 and the first output shaft 30. If the second shift stage, shown in FIG. 2, is actuated with the increased or decreased gear ratio and not one, the input shaft 20 and the first output shaft 30 are separated so that a transmission stage with toothing is formed as a result of engagement of the spur gears 21 and 42. To this end, both clutches 50 and 60 are synchronously switched on/off↔off/on in opposite directions. Preferably, both clutches 50 and 60 are mechanically connected.

The shiftable transmission is preferably designed as what might be called a stand main drive. Thus, the first shifting stage with a ratio of about or equal one is used for high rolling speeds at which the problem of vibration excitation is particularly relevant.

The second switching stage with a reduced speed ratio is used for low rolling speeds when the installation is less vibration-prone.

The described shiftable transmission which is preferably formed as a spur gear-pinion transmission, enables a noticeable reduction of swinging excitations of a rolling stand and which are caused by the drive train, with spur gears being disposed with. Furthermore, this is accompanied by a more favorable dynamic behavior of the drive train in the first shifting stage since inertial masses such as spur gears of a complete shifting stage are eliminated.

A mechanical connection of the clutches 50 and 60 which are to be synchronously actuated during the shifting step, insure the system-inherent safety of shiftable transmission 1.

Further, due to the elimination of a spur gear stage, an inexpensive, compact, and maintenance-free shiftable transmission is provided.

LIST OF REFERENCE NUMERALS

1 Shiftable transmission
10 Housing
20 Input shaft
21 First spur gear
30 First output shaft
31 First pinion
40 Second output shaft
41 Second pinion
42 Second spur gear
43 Bearing
50 First clutch
51 First shift sleeve
52,53 First clutch counterparts
60 Second clutch
61 Second shift sleeve
62,63 Second clutch counterparts

The invention claimed is:

1. A shiftable transmission for use in rolling mills, the shiftable transmission comprising:
   a rotatably supported input shaft subjected to an input torque;
   a rotatably supported first output shaft and a rotatably supported second output shaft arranged parallel to each other and selectively connected by an input transmission stage and an output transmission stage in such a manner that in each shifting stage of the shiftable transmission upon application of the input torque to the input shaft, the first and second output shafts rotate in opposite directions, the input transmission stage including a spur gear stage arranged between the input shaft and second output shaft, the output transmission stage including a gear element stage arranged between the first and second output shafts;
   a first clutch configured to connect and disconnect the input shaft and the first output shaft in a switching manner, wherein in a connecting condition of the first clutch, a first shifting stage of the shiftable transmission is realized in which the input shaft and the first output shaft are connected with each other so that the input torque is transmitted from the input shaft directly to the first output shaft without increased or decreased ratio, without deviation, and without the spur gear stage transmitting rotational motion between the input and second output shafts;
   wherein the input transmission stage further comprises a second clutch for driving the second output shaft in a second shifting stage of the shiftable transmission, the second shifting stage enabling the input torque to the input shaft to be transmitted to the second output shaft via the spur gear stage and to the first output shaft via the output transmission stage, the second clutch connecting and disconnecting the spur gear stage with the second output shaft in a switchable manner, the first and second clutches being synchronously switched on and off between the first and second shifting stages of the shiftable transmission such that during the first shifting stage the first clutch connects the input shaft and first output shaft and the second clutch is disengaged from the spur gear stage, and during the second shifting stage the first clutch is disengaged from the first output shaft and the second clutch is connected with the spur gear stage, and
   wherein the gear element stage includes a first gear element coaxially mounted to the first output shaft and meshing with a second gear element coaxially mounted to the second output shaft, wherein the first gear element drives the second gear element to rotate the second output shaft in the first shifting stage, and the second gear element drives the first gear element to rotate the first output shaft in the second shifting stage of the shiftable transmission.

2. The shiftable transmission according to claim 1, wherein the input shaft and the first output shaft are axially arranged one behind another along a same rotational axis.

3. The shiftable transmission according to claim 2, wherein the first and second output shafts rotate in opposite directions at equal rotational speeds during the first and second shifting stages.

4. The shiftable transmission according to claim 1, wherein the gear element stage includes a first pinion gear fixedly connected with the first output shaft, and a second pinion gear fixedly connected with the second output shaft.

5. The shiftable transmission according to claim 4, wherein the first and second pinion gears have equal sized diameters.

6. The shiftable transmission according to claim 1, wherein the first clutch is a formlocking clutch having a first shift sleeve concentrically arranged with respect to the first output shaft and axially displaceable for shifting the first clutch.

7. The shiftable transmission according to claim 1, wherein the spur gear stage is configured to provide an increased or reduced gear ratio between the input shaft and second output shaft in the second shifting stage.

8. The shiftable transmission according to claim 1, wherein the spur gear stage comprises a first spur gear fixedly connected with the input shaft, and a second spur gear that meshes with the first spur gear and is selectively connectable with the second output shaft via the second clutch such that in a second shifting stage, the input torque from the input shaft is transmitted to the second output shaft by the first and second spur gears.

9. The shiftable transmission according to claim 8, wherein the diameter of the first spur gear is smaller than the diameter of the second spur gear.

10. The shiftable transmission according to claim 8, wherein the second spur gear is disengaged from and freely rotates about the second output shaft in the first shifting stage.

11. The shiftable transmission according to claim 8, wherein the first spur gear is formed integral with the input shaft.

12. The shiftable transmission according to claim 1, wherein the second clutch is a formlocking clutch comprising a second shift sleeve concentrically arranged relative to the second output shaft and axially displaceable for shifting the second clutch.

13. The shiftable transmission according to claim 1, wherein the first clutch and the second clutch are configured to shift together and in opposite directions.

14. A rolling mill for rolling a metal strip and comprising shiftable transmission of claim 1.

* * * * *